United States Patent Office 3,350,839
Patented Nov. 7, 1967

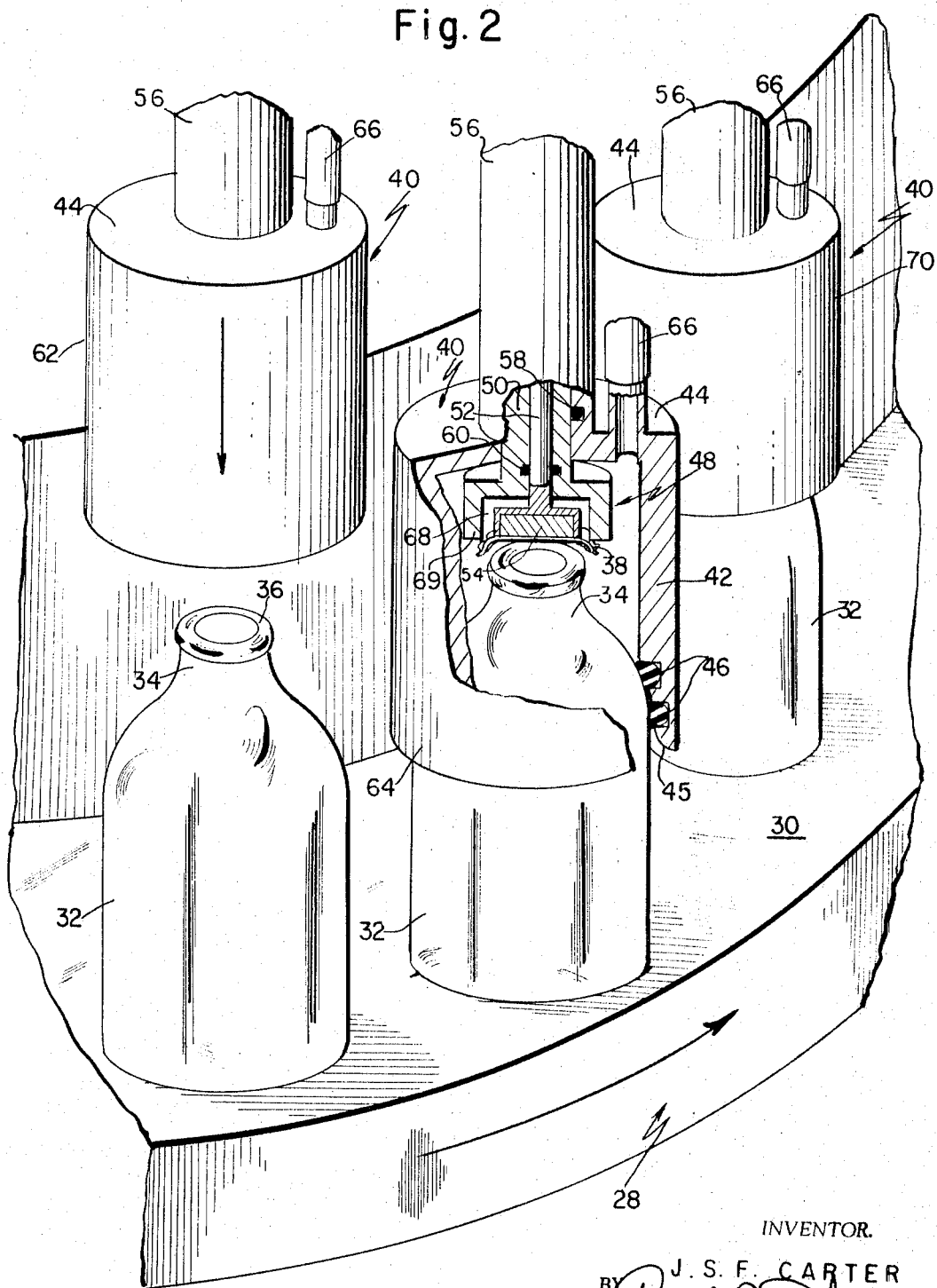

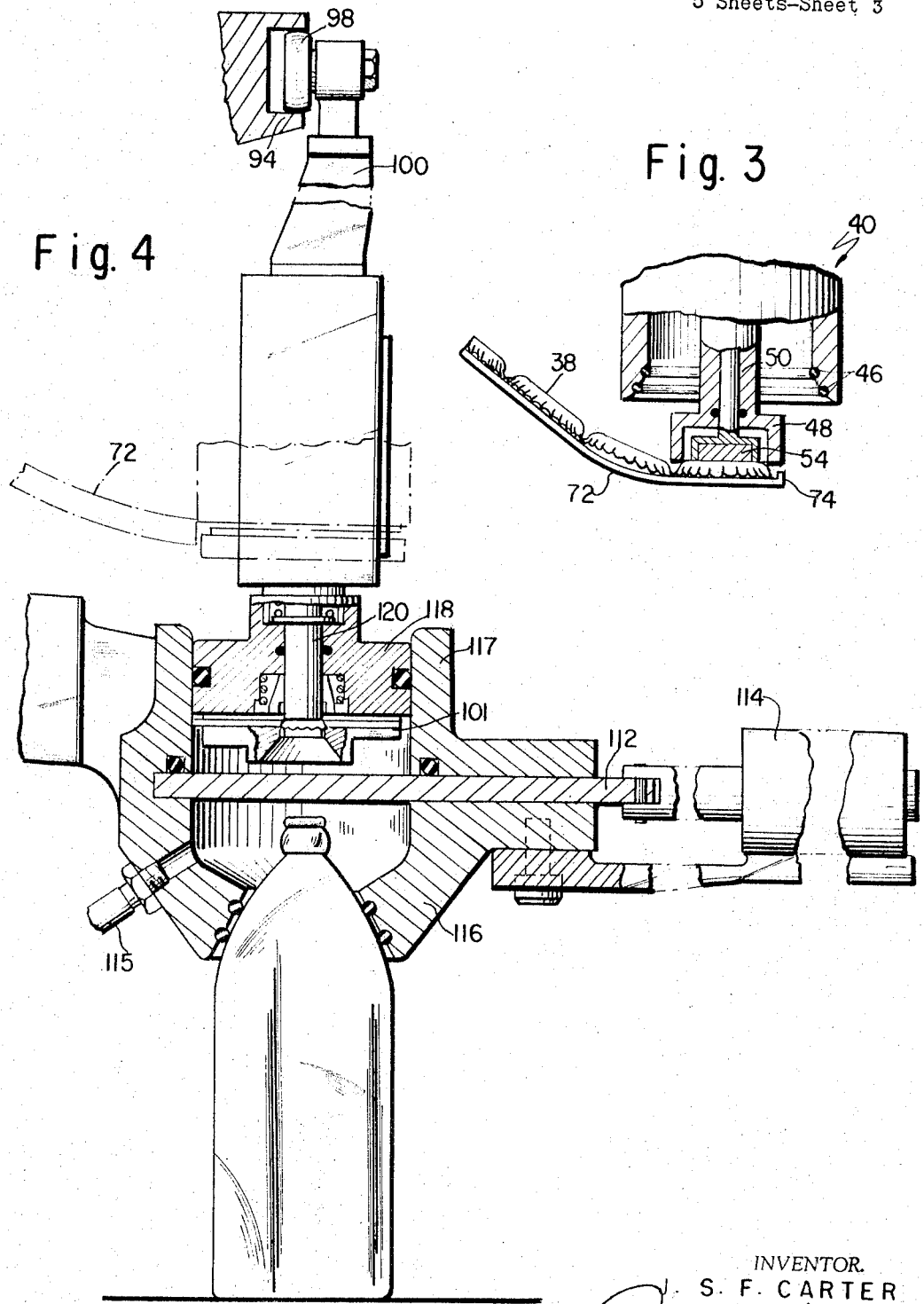

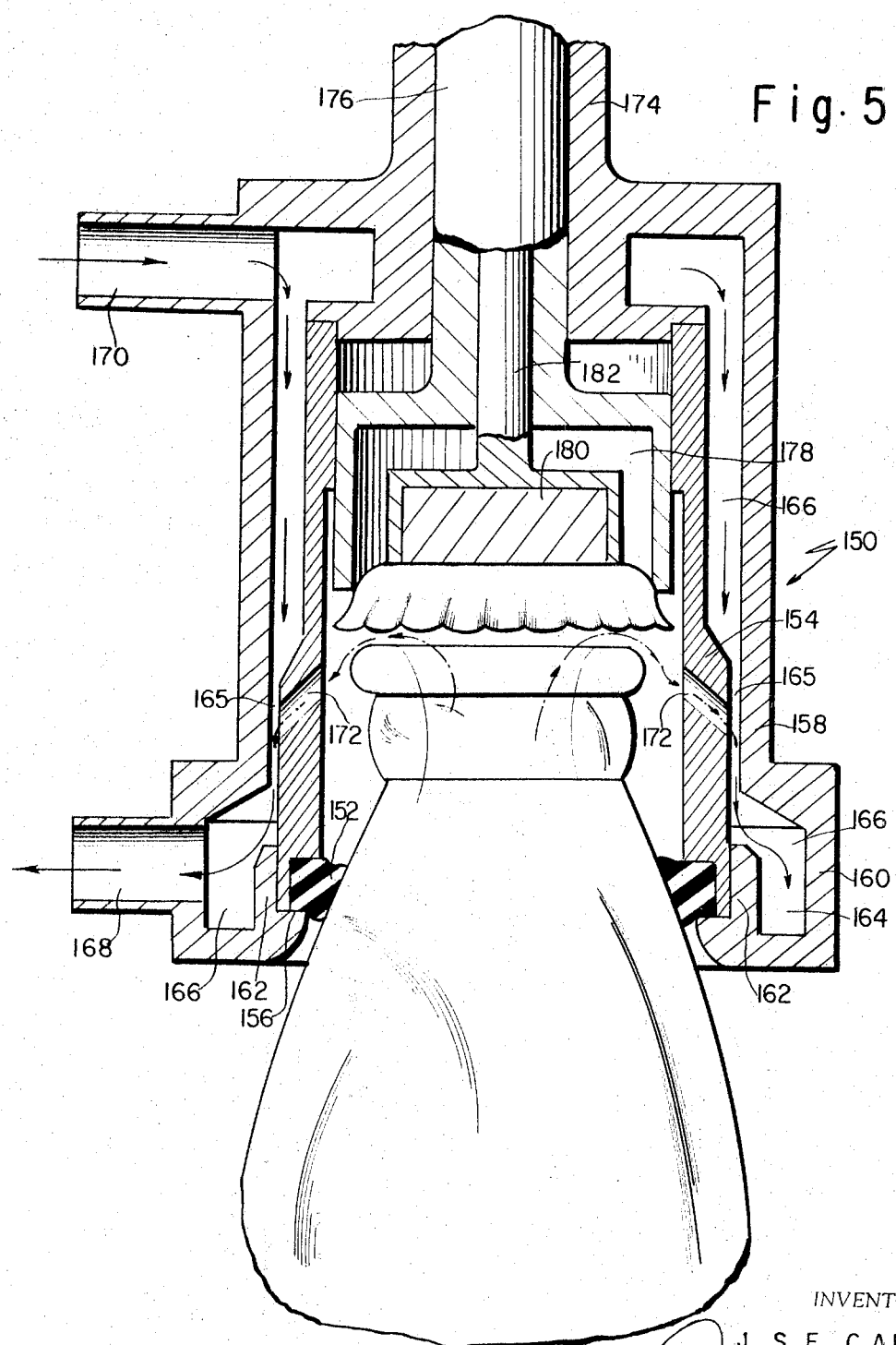

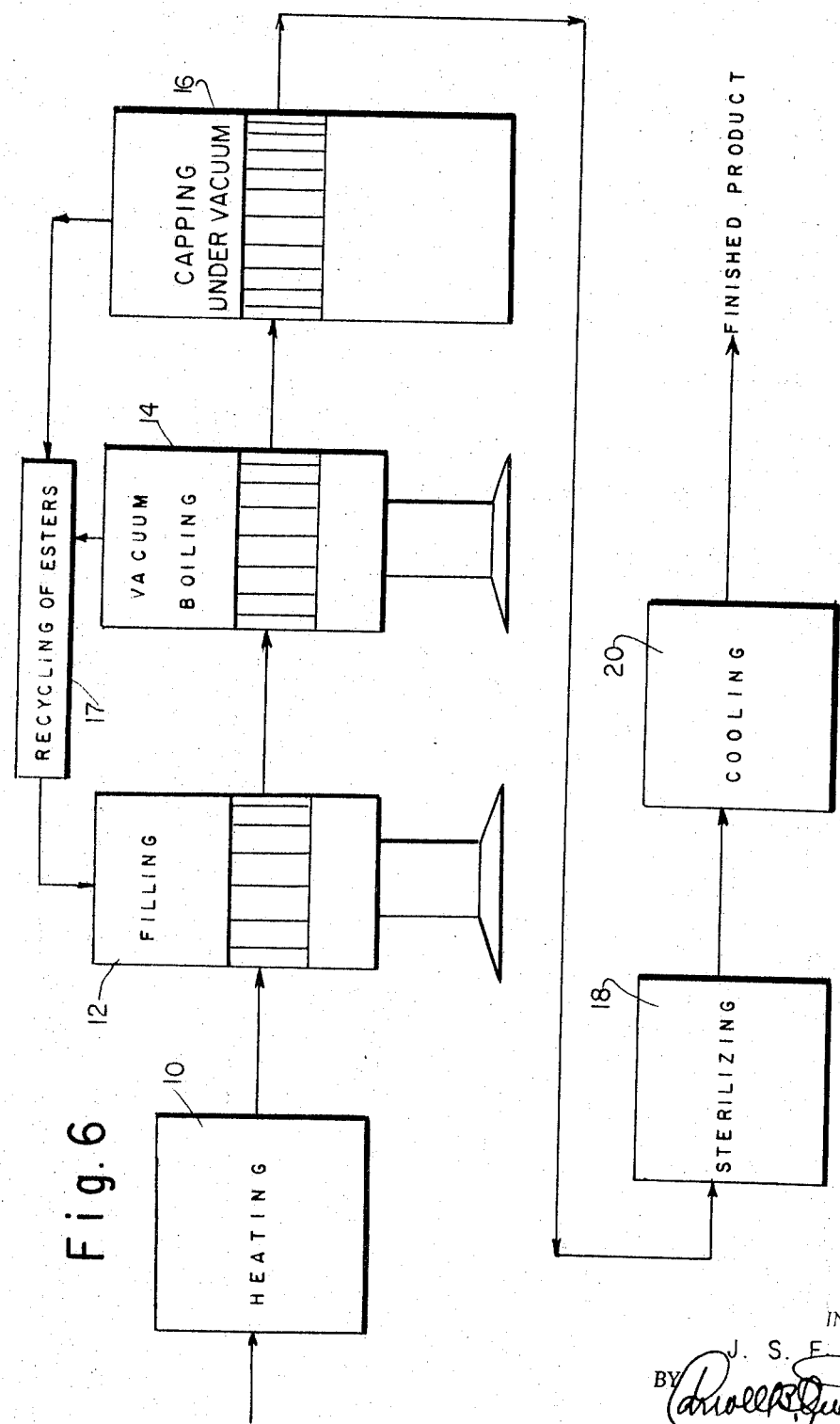

3,350,839
APPARATUS FOR PACKAGING FRUIT JUICES
AND SIMILAR PRODUCTS
James S. F. Carter, Oceanside, N.Y., assignor of one-half
to Kenneth B. Ray, Greenwich, Conn.
Filed July 24, 1963, Ser. No. 297,314
5 Claims. (Cl. 53—88)

ABSTRACT OF THE DISCLOSURE

A process and apparatus for preserving freshly squeezed fruit juices such as tomato and pineapple juice, and particularly citrus fruits and more particularly orange, lime and grapefruit juices. The process and apparatus operate without the use of preservatives or of refrigeration and for those reasons represent a more economical method of preservation than those heretofore known.

---

The preservation is accomplished so that the fruit juices may be preserved for an extended period of time without any change in their characteristics and without loss of nutritive value. The taste of the juice is not impaired by the process and the vitamins in the juices are not adversely affected. Fruit juices when originally separated from the body of the fruit are normally contaminated with certain micro-organisms which tend to cause the juice to deteriorate upon storage. For this reason it has heretofore been necessary to add preservatives and/or to keep the juices under refrigeration. In some cases the juices have been concentrated and frozen. But such methods are expensive. My process is more economical than those heretofore utilized because it does not require the addition of preservatives or refrigeration. This is true in the packaging of the product at the plant and also in its transportation and storage for consumption.

Also, the present invention relates to a process for preserving citrus fruit juices, including physical controls, but not including preservatives, and to apparatus suitable for the practice of the process.

In the process of the present invention, the fruit juices being processed are first heated to a temperature where they may be conveniently boiled under a sub-atmospheric pressure. The temperature used depends upon the specific citrus juice being processed.

After the juice has been heated it is then dispensed into a plurality of individual containers in which the juice is to be packaged, stored and shipped or distributed to consumers. After the juice has been dispensed into the containers it is then subjected to a vacuum advantageously in the apparatus of the invention, until the juice goes through an ebullition step, or boiling step, which removes entrained gases and probably some of the micro-organisms with which the juices are normally contaminated. The presence of micro-organisms and gases tend to cause the juice to deteriorate upon storage. While the vacuum is maintained the container is sealed off or closed by a crown cap member.

The juice in the sealed container is thereafter sterilized and the container is thereafter cooled, or permitted to cool, to atmospheric conditions. In this way, the degassed, purified, and sterilized juice may be rendered suitable for storage at room temperature for a long period of time without deterioration.

In accordance with the present invention, the preheating of the citrus juice before it is dispensed into the container is accomplished at a temperature that is not as high as the sterilization temperature so that the specific or particular fruit juice will not have an off-color or disagreeable or artificial taste because of the use of high temperature, but will have its natural taste and flavor, which flavor is equivalent, for example, to the flavor and taste of the citrus fruit juice of citrus fruit freshly picked from trees.

It is another object of the present invention to provide a process of packaging citrus fruit juices including a sterilizing operation that is preceded by a process of ebullition at lower temperatures and under vacuum pressure so that the citrus juice will not in any way have a darkened color after the treatment and it can be safely kept or stored for a relatively long period of time without the need of refrigeration.

It is another object of the present invention to provide a process and apparatus for packaging citrus fruit juices so as to avoid any increase in the consumer price for such a food product by utilizing apparatus that is essentially practical and economical and which requires no complicated manipulation and provides a rapid and large scale production to reduce the time and effort required in carrying out the operation.

It is another object of the present invention to provide a process and apparatus for packaging citrus fruit juices that will permit the use of returnable containers since the so-called throw-away container is quite expensive when compared in relation to the price of the contents, and particularly when the containers can be reused over an indefinite period of time.

It is yet another object of the present invention to provide for packaging citrus fruit juices and the preservation of said citrus fruit juices in containers that are returnable for continued use, which process is capable of storing the citrus juice at room temperature without loss of its nutritive qualities or alteration of its taste characteristics over a relatively long period of time and without the use of refrigeration.

It is another object of the present invention to provide an apparatus for packaging citrus fruit juices having novel bottle sealing means for the containers into which the juice is dispensed and a permanent magnet member that eliminates the requirement for the utilization of a source of electrical energy therewith.

It is another object of the present invention to provide an apparatus for packaging citrus fruit juices with novel vacuum forming means embodied therein for carrying out the vacuum step of the operation.

It is still another object of the present invention to provide an apparatus for processing citrus fruit juice having embodied therein a slidable sealing member for reducing the area or volume upon which a vacuum must be maintained in order to remove or evacuate air from the bottled fruit juice.

It is another object of the present invention to provide apparatus for packaging citrus fruit juices under vacuum which can be drawn or maintained upon the citrus juice within the container from a substantially vertical direction, or from a substantially horizontal direction, or from a vacuum line that is disposed below the upper end of the bottle from which the air is being evacuated.

It is another object of this invention to present a process for the preservation of fruit juices for a substantial period of time without refrigeration while preserving the taste of the fresh juice, the vitamin content and the other nutritive qualities.

It is a further object of the invention to present a process for the preservation of fruit juices in containers without the use of refrigeration or of preservatives.

It is a still further object of the invention to present a process in which fruit juices, including orange and grapefruit juice, may be packaged, shipped and stored without refrigeration or preservatives and in such a fashion that the taste of the fresh juice is not impaired.

A still further object of the invention is an automatic process for packaging of fruit juices, including orange and grapefruit juice, in such a fashion as to preserve the original taste of the juice for an extended period of time.

In summary, in a preferred embodiment the process of the present invention comprises taking a citrus juice such as orange juice or grapefruit juice, and heating it to a temperature that is below its specific boiling point under normal or atmospheric pressure, placing the juice in glass container of the type that is returnable for further use in which the product is to be delivered to the ultimate consumer, and thereafter creating a vacuum on the interior of the filled container until there is incipient boiling of the juice to remove non-condensible gases from the interior of the bottle, and maintaining said vacuum for a relatively short period of time, such as a number of seconds, and while still pulling said vacuum on the interior of the container, hermetically closing off or sealing container by crimping or securing a crown cap to the top of the container without permitting air to enter the bottle and, subjecting the container and the contents of the citrus fruit juice therein to the action of heat at or within a predetermined temperature range above said incipient boiling temperature for a predetermined time to sterilize the juice.

Various other objects and advantages of the invention will be readily apparent from the following detailed description when considered in connection with the accompanying drawings forming a part hereof and in which:

FIGURE 2 is a perspective view of a modified apparatus of the invention;

FIGURE 3 is a detail view of apparatus for feeding the crown caps to the crown holder member utilized in carrying out the present invention;

FIGURE 4 is another embodiment of the apparatus of the present invention including the slidable sealing means for evacuating the interior of the bottle;

FIGURE 5 is still another modification of the apparatus utilized in carrying out the process of the present invention; and FIGURE 6 is a flow diagram of the steps embodied in the process of the present invention.

Figure 1:
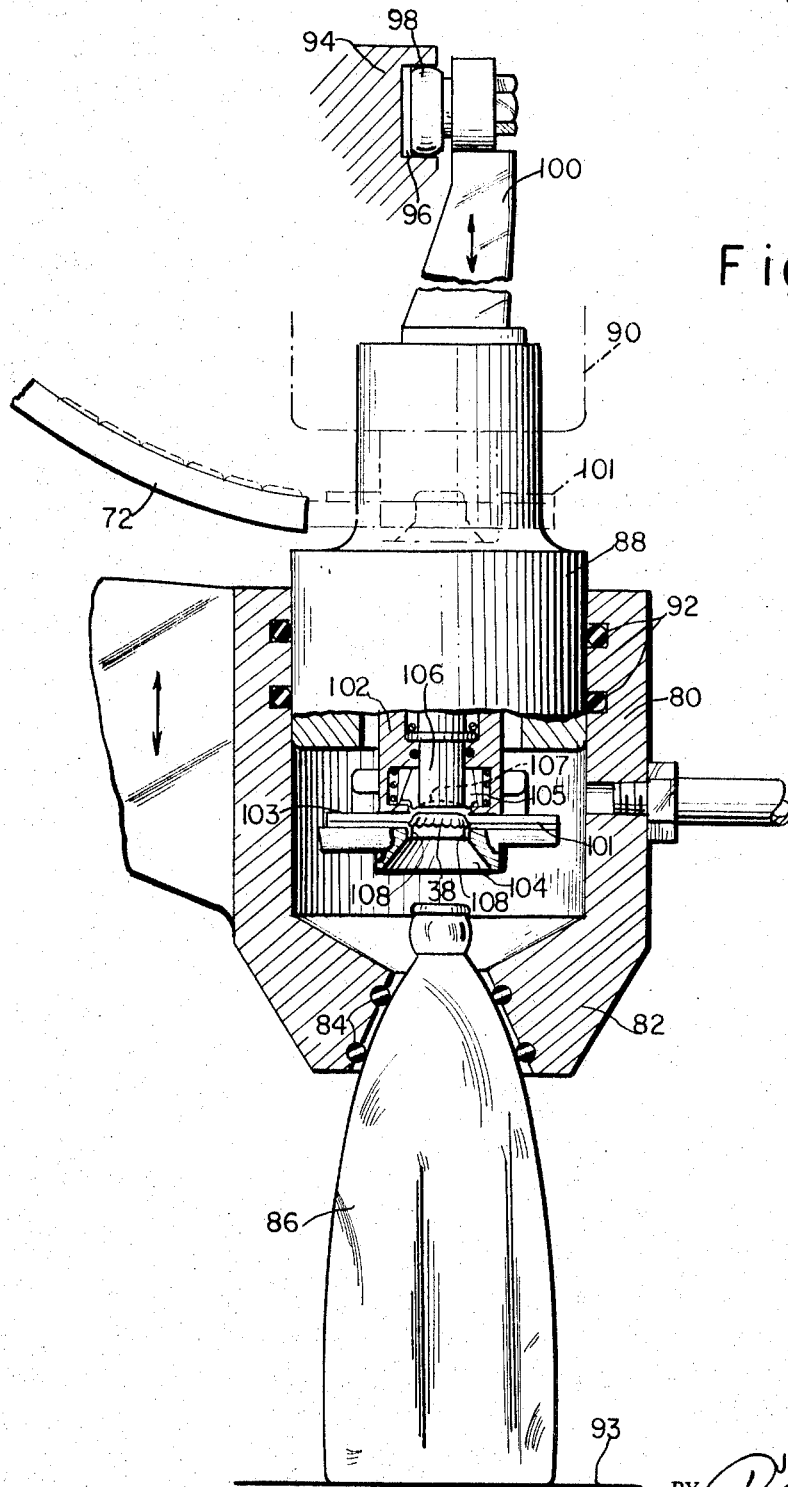
FIGURE 1 is a side elevational view partly in section illustrating the apparatus of the present invention.

Referring to the drawings and particularly the flow diagram of FIGURE 6, the reference numeral 10 generally designates a heating step or zone which can be a heater of a well-known type in which a quantity of the orange juice to be processed and packaged is disposed and heated prior to filling or dispensing the citrus juice into the individual reusable glass containers in which it is packaged. In accordance with the present invention the orange juice is heated in this step to a temperature where it may be conveniently boiled when placed under a vacuum in the vacuum step of the present invention. The temperature can vary with the vacuum available and the juice being processed. For instance, in the packaging and preservation of orange and grapefruit juice the preheating should be to a temperature of about 50–60° C. This temperature range is quite critical for processing of orange juice where a temperature of about 56° C. has proven satisfactory. It has been found that when the temperature of the orange juice is in this range and a vacuum is pulled on it to cause ebullition, or boiling, the orange juice does not take on an off-color taste, or have an artificial flavor, or have any discoloration after the treatment and it can be safely kept with its original flavor or taste for a relatively long period of time without refrigeration.

After the juice has been properly heated it is then passed through to a filling zone or step 12 in which a plurality of reusable containers, such as glass jars or bottles, are filled with a predetermined quantity of the citrus juice.

After the filling step the juice is then subjected to a vacuum to remove from the interior of the container any and all air and non-condensible gases. The vacuum or boiling step is generally designated 14 and a vacuum is maintained on the individual containers filled with the orange juice until there is incipient or minimal boiling of the juice. The boiling or ebullition of the orange juice in the vacuum step 14 is accomplished at a temperature of 56° C. by creating in the interior of the bottle capping zone a pressure of approximately 125 millimeters mercury absolute. The orange juice contained within the bottle enters into ebullition and the boiling is continued for approximately 15 to 20 seconds, at the end of which period the bottle is hermetically closed in a sealing step or zone 16 while still subject to said vacuum by crimping a crown cap onto the neck of the bottle or container in a known way.

After these steps in the process of the present invention the container with the orange juice goes through a capping step, generally designated 16, and is sealed while the vacuum is still being pulled. If the juice is not in a natural state, but is concentrated, the vacuum is increased corresponding to the sugar concentrate in the fruit juice. It will also be noted as indicated at 17, there is a recycling of the light esters at steps 14 and 16 back to the pulling step 12. This is because some of the aromatic esters which are the taste components come off in the ebullition step, and they are therefore condensed and put back in at the filling zone, since they make the juice taste more pleasant.

After the container has been sealed, it is then placed in a sterilizing zone 18 which can be a heater or any other well-known heating means and the bottle and its contents are heated to a temperature of approximately 85° C., and within the range of about 80–90° C. for approximately 6½ minutes. Thereafter, the sterilized bottle and its contents are placed in a cooling zone 20 which may be a zone having an ambient room temperature and left there until the bottle is gradually cooled down to atmospheric conditions. The bottle can also be cooled in warm water by agitation of the water for approximately 6½ minutes or it can be cooled by passing it through cool water.

In connection with processing of other citrus fruit juices, such as grapefruit and lime juices, the above-mentioned process may be followed with the grapefruit and lime juice being pre-heated to about 56° C. and thereafter being evacuated and capped under a pressure of approximately 125 millimeters mercury absolute.

When orange juice was processed in accordance with the above described operation, it was found that the orange juice maintained its natural flavor and taste and had no discoloration whatsoever after it was stored in glass containers in which it was bottled for a period of approximately 3 months at room temperature and without refrigeration.

Referring to FIGURE 2 of the drawing, the reference numeral 28 generally designates a rotatable table member which rotates in the direction indicated by the arrow in the figure and is driven by well-known means not forming part of the invention. Disposed on the outer periphery or circumferential portion 30 of the table are a plurality of identical glass bottles or containers 32 having a neck 34 with the usual annular bead 36 extending therearound adapted to receive a well-known crown cap member 38 thereon to seal off and close the interior of the bottle from the atmosphere. The table 28 is provided with well-known clamping means not shown so that the bottles are disposed in a predetermined position thereon as they travel or rotate around in a circle.

A plurality of identical reciprocating mandrels or members 40 are provided operatively connected to synchronize with the rotation of the table 28 by well known means. Each member 40 in FIGURE 2 is shown in three different sequences of operation, and there is a member 40 provided for each container 32 on table 28. A member 40 is adapted to move downwardly into sealing engagement with a container 32 after it has been filled, and maintain a seal thereon while the container is being evacuated and capped or sealed after which the member 40 is raised therefrom, with all of these movements of member 40 being accomplished by well known means. The reciprocating members 40 are disposed by well-known means in vertical alignment with a container 32 as it rotates with table 28, so that a number of containers can be processed simultaneously. Member 40 consists of a cylindrical hood or bell member 42 closed at its upper end or top 44 and open at its bottom end. The inner surface of the lower end of the cylindrical bell member 42 flares outwardy, or is tapered or beveled as at 45 and is provided with two O-ring gasket members 46 secured by a suitable means in recesses in the inner surface 45 of the interior of the cylindrical member 42 and adapted to engage the exterior surface of the container 32 so as to form an airtight seal therewith, and particularly the upper portion of the container below the neck 34 as is clearly shown in FIGURE 2. It will be noted that the gasket members 46 are spaced vertically of each other and the upper gasket member has a smaller diameter due to the taper of 45, so that the member 42 can seal on one gasket or the other, different size bottles. The cylinder member 42 is of sufficient length so that the neck 34 of the bottle extends up wardly a substantial distance therein when a gasket member 46 is sealed against the bottle, but out of contact with a reciprocating mandrel 48 disposed within the bell member. Mandrel 48 is adapted to move axially upwardly and downwardly in a vertical direction with respect to the longitudinal axis of the bell member 42 by well known means. The mandrel 48 is provided with a central shaft 50 with an axial bore extending therethrough and in which is disposed a rod or plunger 52. The lower end of the plunger 52 is provided with a permanent magnet 54 suitably secured or fixed thereto, which permanent magnet is adapted to carry a crown cap 38 and maintain it by magnetic attraction secured to the magnet until the mandrel 48 sealingly crimps it onto the rim 36 of the container.

The plunger 52 is operatively connected to the hollow shaft 50 by well known means so as to move axially relative thereto. The hollow shaft 50 is disposed within an elongated casing 56 formed in the bell member 42 and an O-ring seal 58 is disposed in a recess in the casing to provide an airtight seal between the outer surface of the hollow shaft 50 and the inner surface of the casing 56. Another O-ring seal member 60 is disposed in a recess in the inner surface of the shaft 50 so as to provide an airtight seal between the plunger 52 and the shaft 50.

After the container 32 has been filled with orange juice and heated, as already described in connection with the flow diagram of FIGURE 6, the cylindrical or bell member 42 is operated by well-known means from its raised position indicated as 62 in FIGURE 2 to the sealing position indicated as 64, at which time the O-ring seal 46 seals off the interior of the bottle and the portion of the bottle disposed within the bell member 42 from the atmosphere.

Thereafter, a vacuum is drawn on the space or chamber within the bell member 42 through a vacuum line 66 in communication with the interior of the bell member 42 through the top 44 of it. The desired vacuum is then pulled or created in the interior of the bell member and the interior of the container from a well known vacuum source, not shown, so that ebullition or boiling of the orange juice within the container occurs. As already stated, the vacuum is maintained a sufficient period to cause incipient or minimal boiling to substantially remove all air from the bottle. The orange juice is substantially water except for the small solid content thereof and a vacuum of approximately 5% more than the heat required if the orange juice were 100% water is maintained on the interior space of the bell member 42. If the juice is concentrated then it is preferred to pull a vacuum of approximately 15% more than the heat required for boiling water.

It is realized that during the pulling of the vacuum that the plunger 52 is disposed with its magnet 54 positioned in the circular recess 68 in the bottom head 69 of the reciprocating mandrel 48, and the magnet 54 and the crown cap 38 magnetically secured thereto are spaced above and out of contact with the rim 36 of the bottle so that the vacuum will act upon the interior of the bottle 32 and the orange juice contained therein.

The interior of the bell member 42 has the vacuum pulled or maintained therein for approximately 20 seconds until the juice boils.

Thereafter, the plunger 52 and the crown cap 54 carried thereby and the mandrel 48 are both moved axially downwardly by well-known means until the crown cap 48 is seated on the rim 36 of the bottle, after which the reciprocating mandrel 48 is moved axially downward relative to the plunger 52 and the permanent magnet 54, so as to secure or crimp the skirt of the crown cap onto the rim 36 of the bottle to close off and seal the evacuated interior of the bottle from the atmosphere. Thereafter, the table 28 and the mandrel 40 are rotated or moved to the next position indicated as 70, during which time the vacuum operation is stopped and the bell member 42 is lifted out of sealing engagement with the bottle and the bottle is sent to a discharge station, not shown, by well known means.

Thus, the apparatus in FIGURE 2 of the invention for packaging orange juice has a permanent or fixed magnet that holds the crown cap securely thereto until such time as it is secured onto the rim of the bottle and does not require any external connections such as required in cap carrying members utilized heretofore and further does not require an external source of electrical energy.

This embodiment of the invention further provides the tapered inner surface of the bell member with sealing gaskets spaced vertically therein so that a seal can be provided for different size bottles and different configurations because of the different diameters of the sealing rings utilized.

Referring to FIGURE 3, this is a detail view of the means of feeding the crown cap 38 down an inclined chute 72 with a stop member 74 adjacent the lower end thereof so as to position a cap in proper vertical alignment with the permanent magnet 54 of the plunger 52 as it passes a station on the rotatable table apparatus for picking up a crown cap member before it reaches the position indicated as 62 in FIGURE 2 of the operation. This is accomplished by well known means that permit plunger 52 to extend below the lower end of the bell member 40.

Referring to the embodiment of the invention shown in FIGURE 1, the cylindrical bell member 80 is provided with a large opening in the top and a downwardly and inwardly inclined bottom portion 82 with spaced vertical O-ring member 84 of different diameters disposed on its inner tapered surface adapted for forming an airtight seal with various size containers such as the container 86. The device is provided with an enlarged hollow cylindrical mandrel 88 which extends through the upper opening of the bell member 80 in a slidable relationship therewith and is adapted to reciprocate in a vertical axial direction with respect to the central axis of the bell member 80, from the position shown in full lines in FIGURE 1 to the uppermost position indicated in dotted lines as 90, at which time the mandrel is completely positioned outside of and above the bell member 80. Two O-ring seals 92 are provided in the inner surface of the bell member forming an airtight seal with the outer surface of mandrel 88. The mandrel 88 is carried from an overhang member or trolley structure 94 which is provided with an elongated recess 96 forming a track or guide for a roller 98 secured to a support arm 100 which carries the mandrel 88. The recess 90 in effect is a cam and its vertical distance from the table 93, on which the juice container is disposed and travels, varies at different points or stations along the apparatus, so that as the roller 98 which is a follower, moves along a path of travel, the mandrel 88 moves upwardly and downwardly vertically with respect to the bell member 80 and the table. For example, in the dotted line position 90, the mandrel is disposed completely out of bell member 80 and in its uppermost position so that a bottle cap 38 can be fed from inclined chute 72 onto the horizontal cap slot or guide 101, as the bell member passes the cap feeding station. The cap slot is formed in the lower end of a cylindrical plunger member 102 and has opposite upstanding side walls 103, and has a suitable stop not shown so the cap can be disposed in a proper position on it. The cap feeding apparatus is well known and can have an air jet if desired to move it against a stop on the slot 101.

The overhang structure 94 can be either straight or circular if desired, depending upon whether it is used with a straight table, such as 93 or a rotatable circular table.

The mandrel has disposed therein the plunger member 102 having a frusto conical recess 104 in the lower end thereof below slot 101 forming an annular die. The cap blank 38 before crimping is larger than the cross sectional area of recess 104 and cannot fit through it, but is merely seated over the small circular opening 105 adjacent the upper end of 104.

Plunger 102 and its die are both operatively connected to bell member 80 and mandrel 88 by well known means so as to be axially moveable relative thereto in a vertical direction.

An inner cylindrical mandrel 106 is disposed within plunger 102 and is provided with a plurality of radial spaced ribs 107 projecting outwardly therefrom and a concave bottom 108 for forcing or pushing the cap 38 through the circular space 104 to crimp it onto the top of the bottle. In securing the bottle cap to the bottle top, the lower ends of the ribs extend into spaced corresponding slots in die 104 and decrease the width or horizontal dimension of the cap so it can pass through the die.

In this embodiment of the invention, after the bottle is filled with orange juice by any well known means and the bell member 80 is disposed in sealing engagement with the bottle, a vacuum is pulled on the contents of the bottle and space or chamber in member 80 through a horizontal vacuum line 109 in the side of member 80, and maintained until the cap seals off the bottle.

It is realized that member 80 can be raised and lowered in a vertical direction by any well known means, and that outer mandrel 88 is positioned in a lowered position during the capping step, and that the neck of bottle 86 is disposed within the recesses in the die, and inner mandrel 106 is movable axially downward relative to plunger 102 to secure the cap on the bottle, by well known means, not shown.

Thus this embodiment of the invention provides means for sealing of the filled citrus fruit bottle under vacuum with novel means for feeding the cap into a slot or guide in the die and pushing it through the die to secure it to the bottle, and requires no magnet means. The sealing means in the bell member also permit bottles of various dimensions to be filled with the apparatus, and enables a plurality of bottles to be processed simultaneously.

With respect to FIGURE 4, the structure and operation of the apparatus is substantially the same as that described for FIGURE 1, except that there is a slidable sealing member or plate 112 operated by a solenoid 114 to decrease the space or area above the bottle to be evacuated. The vacuum suction 115 line extends diagonally downwardly, and is located in the inwardly extending tapered bottom 116 of the bell member 117 which is of less depth, than bell member 80. The outer mandrel 118 is of substantially less thickness than mandrel 88, and presents a compact structure directed toward the purpose of decreasing the space to be evacuated. In the sequence of operations the plate 112 is moved out of the space within the member 116 and outer mandrel 118, along with the mandrel 120 are simultaneously moved downwardly to maintain a minimum space to be evacuated during the capping operation. It will also be noted that die 122, similar to the die in FIGURE 1 is formed on the mandrel 118 and eliminates the need for a plunger in this embodiment.

With respect to the embodiment of the invention shown in FIGURE 5, a bell shaped cylindrical member 150 is provided having an annular beveled or tapered seal ring member 152 disposed in the lower portion thereof for forming an air-tight seal with the outer surface of containers of various sizes to be filled. The annular ring 152 is disposed in an inner sleeve member 154 forming part of the cylindrical bell member 150. The inner sleeve member 154 is secured to an annular shoulder 156 of an outer sleeve member 158 of the bell member. The outer portion 158 of the bell member is provided with an annular outwardly extending portion 160 having an inwardly and upwardly extending section 162 forming an annular chamber 164 therebetween. The lower portions of outer surface of the inner sleeve 154 projects outwardly and with the inner surface of the outer sleeve 158 forms a narrow elongated annular chamber 165 therebetween. Annular chamber 166 above chamber 164 is substantially greater in cross-sectional area than chamber 165 so that a venturi passage is formed between the inner and outer sleeve members 154 and 158, respectively. An air discharge line 168 is in communication with the chamber 164 while an air supply line 170 is in communication with the chamber 166 adjacent the upper end of the outer member 158 so that air under pressure can be flowed through the annular chambers to create a venturi effect and pull air from the interior of the inner sleeve 154 through a plurality of small drilled bores 172 therein and create a vacuum.

The bell member 150 is provided with a hollow elongated shaft 174 in which is disposed a cylindrical hollow mandrel shaft 176, similar to the mandrel shaft 50 described in connection with FIGURE 2. The lower end of the shaft has a mandrel 176 provided with a cylindrical recess 178 in which is disposed a permanent magnet 180 secured within the recess of a plunger 182 disposed in mandrel 176. Plunger 182 and its permanent magnet are operatively connected by well known means to move axially of the mandrel 176 while the mandrel 176 is operatively connected by well known means to move in an axial direction relative to the plunger 182 and the inner sleeve 154 of the bell member. Suitable O-ring seals, not shown for purposes of clarity, may be used to form an air seal between the component parts. The operation of this embodiment of the invention is substantially the same as that described in connection with FIGURE 2 except that instead of using a source of vacuum, a venturi effect is utilized to evacuate the interior of the inner sleeve member after the container has been filled.

Inasmuch as various changes may be made in the particular form, and arrangement of the article and in the steps of the process and other sequences as disclosed without departing from the principles of the invention, it will be understood that the invention is not to be limited excepting by the scope of the appended claims.

What is claimed is:

1. In an apparatus, provided with heating, filling and sterilizing means, for vacuum sealing a liquid within a container comprising a cylindrical member open at the top and bottom, the lower portion of said cylindrical member extending inwardly, and having a tapered inner surface, vertically spaced gasket ring members disposed on said surface, said ring members having different size diameters to sealingly engage containers of different sizes, an axially moveable member slidably disposed in said cylindrical member and sealing off the top opening of said cylindrical member, a container cap holding member disposed within said cylindrical member and axially movable relative thereto and to said axially moveable member, axially moveable mandrel means disposed within said cap holding means for securing a cap on a container, and conduit means in communication with the space within said cylindrical member for pulling a vacuum thereon.

2. The apparatus of claim 1 wherein said cap holding means comprises a horizontal member with a horizontal slot for supporting a container cap blank thereon and an annular die with a circular opening therein of smaller size than the size of said blank, and said mandrel means consist of spaced radial ribs disposed over said circular opening, for crimping said blank and decreasing its size to push it through said circular opening onto a container, and corresponding slots are provided in said die to receive said ribs therein.

3. The apparatus of claim 1 wherein horizontal sealing plate means extend through said cylindrical member for decreasing the space to be evacuated in the lower portion of said cylindrical member, and means are provided for sliding said sealing plate means into and out of said space, and said conduit means communicate with said space through said tapered inner surface.

4. In an apparatus, providing with heating, filling and sterilizing means, for vacuum sealing a liquid within a container comprising a cylindrical member having inner and outer spaced portions forming a closed annular chamber therebetween, said chamber having a restricted cross sectional area therein to provide a venturi therein, air inlet means in communication with one end of said chamber to supply air under pressure thereto, air outlet means in communication with the other end of said chamber to discharge said air therefrom, said cylindrical member being closed at the top and open at the bottom, a ring gasket with a tapered inner surface disposed in said inner portion adjacent the open bottom to form an air tight seal with a container below said member, air passage means extending through the lower end of said inner portion and in communication with the space within said inner portion and said annular chamber to evacuate air from said space, axially moveable cap holding means disposed within said inner portion, and axially moveable mandrel means disposed in said inner portion for securing a cap to a container, said cylindrical member, mandrel means and cap holding means being axially moveable relative to each other.

5. The apparatus of claim 4 wherein said cap holding means is a permanent magnet.

References Cited

UNITED STATES PATENTS

| | | |
|---|---|---|
| 2,235,583 | 3/1941 | Kronquest et al. _____ 53—88 |
| 2,378,640 | 6/1945 | Kantor _____ 53—88 |
| 2,517,569 | 8/1950 | Huzenlaub. |
| 2,700,497 | 1/1955 | Hall _____ 53—88 |
| 2,862,821 | 12/1958 | Wilber et al. _____ 99—182 |
| 2,862,822 | 12/1958 | Whitmore _____ 99—182 |
| 2,874,523 | 2/1959 | Ryan _____ 53—88 X |
| 2,974,456 | 3/1961 | Parodi _____ 53—88 |

TRAVIS S. McGEHEE, *Primary Examiner.*